United States Patent Office 2,830,884
Patented Apr. 15, 1958

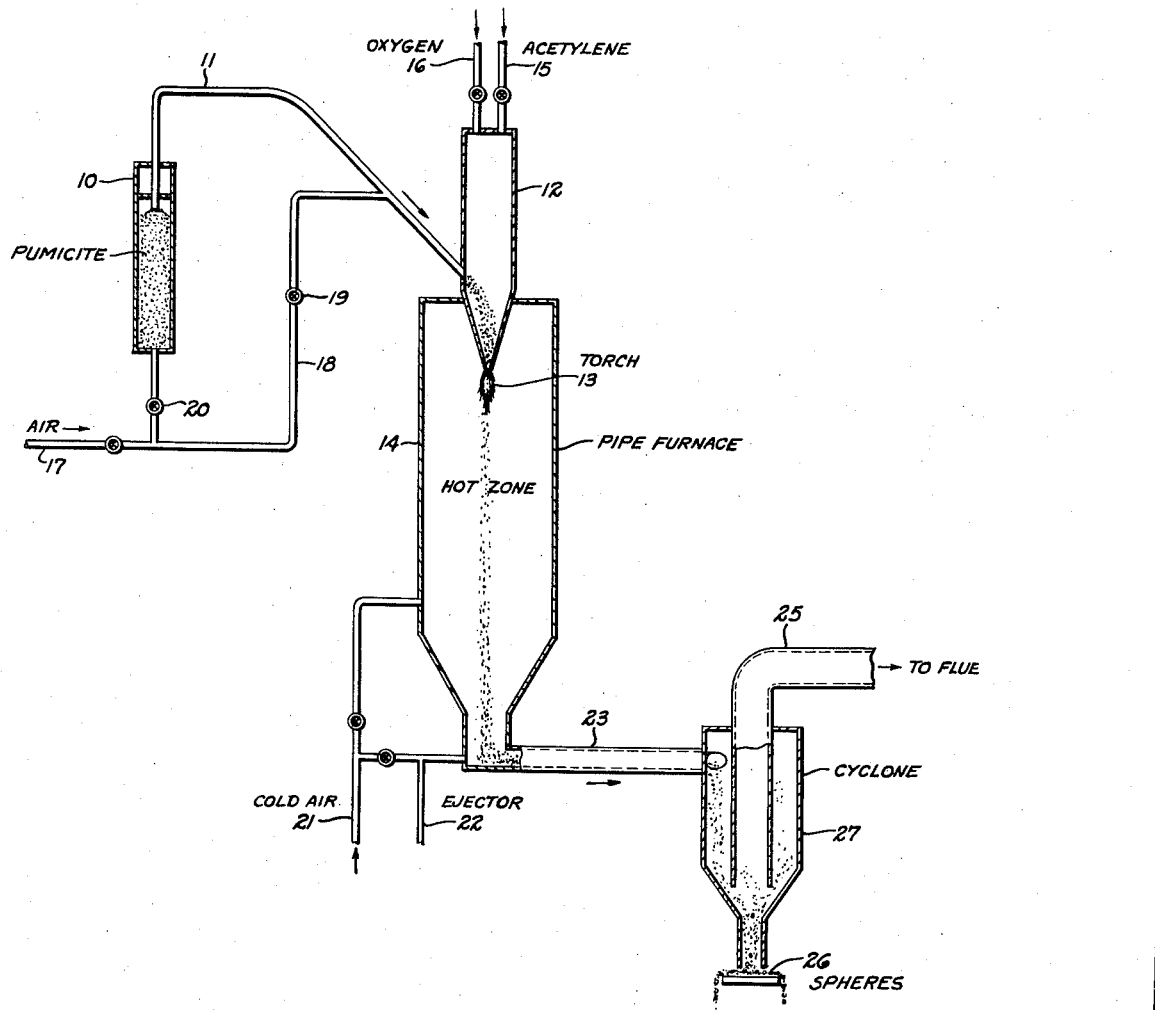

2,830,884

ABRASIVE COMPOSITION

William D. Smiley, Palo Alto, Calif., assignor to C. H. B. Morrison, Fresno, Calif.

Application April 5, 1954, Serial No. 420,896

4 Claims. (Cl. 51—307)

This invention relates to abrasives and more particularly to abrasives for grinding, finishing and polishing glass such as glass plate, optical glass and spectacle lenses. Still more particularly this invention relates to a powdered abrasive or lapping compound having the characteristics of fast cutting without scratching. The invention is illustrated by a drawing which shows an apparatus for making one component of my new abrasive.

In the manufacture of lenses, three operations are usually employed requiring abrasives viz: grinding or roughing, finishing and polishing. In critical "finishing" operation, the deep scratches left in grinding must be removed rapidly, leaving the surface smooth and without further scratches difficult to remove in polishing. The polishing operation is usually done with jeweller's rouge or, better, with cerium oxide having a particle size of about 1 micron or less. If the finishing operation is not done properly, the time required in the polishing operation is inordinately long, thus materially increasing the cost of the lenses.

In previous practice, the ground lens was finished with emery having a particle size of about 12–36 microns and then was polished with cerium oxide in about 8 minutes. In these operations, the abrasive is commonly applied as a slurry with water or oil, the glass blank or lens being rotated on a wheel or disk.

I have now discovered that the finishing operation can be greatly improved in both speed and quality by employing an abrasive which is a mixture of emery and specially graded pumicite of a narrow range of particle size.

The emery for my purpose is preferably the grade having a particle size of about 12–36 microns. In place of emery, I can also use other similar abrasives such as Carborundum, garnet, fused alumina, quartz or spheroidized pumicite to be described hereinafter, providing the particle size is in the range of about 10 to 50 microns. These abrasives are characterized by granules approaching cubical or octahedral shape which I describe as "equidimensional" as opposed to prisms and needles. With these abrasives I mix about 50 to 80% by weight of pumicite which has been ground and sifted to pass a 325 mesh screen (about 44 microns maximum particle size).

For this I prefer to use a high alumina type pumicite containing about 14% to 17% $Al_2O_3$ by weight and about 68 to 73 $SiO_2$.

Typical of the pumicites I prefer to use are the minerals obtained from the formation near Friant, California, having the following approximate analysis:

| | Percent |
|---|---|
| Silica | 72.4 |
| Ferric oxide | 0.7 |
| Aluminum oxide | 14.3 |
| Calcium oxide | 0.1 |
| Magnesium oxide | 0.4 |
| Sodium oxide } Potassium oxide } | 7.8 |
| Water lost on ignition | 4.3 |

This material is a white, volcanic glass composed of angular fragments of rhyolite glass (92%) and the remainder quartz, feldspar, fine clay and residue. The material, as mined, gave a wet screen analysis of 87% thru 325 mesh and 99 plus percent thru 140 mesh. Analysis under the microscope with a calibrated eyepiece showed particles ranging from 6 to 240 microns in length. When ground and screened to pass 325 mesh, it contained about 15% finer than 5 microns which could be removed readily by elutriation. The remaining graded pumicite had an average particle size of about 20 microns. Removing the material below 5 microns reduces the packing tendency. The particles are very angular. The bulk density was 48 pounds per cu. ft. and specific gravity about 2.34 to 2.40. It began to melt in a muffle furnace at 2300° F. and was completely fused at 2500° F. The hardness of the fused material was about 6 to 6.5, Mohs' scale, the pumicite as mined being somewhat softer.

The pumicite as mined is most conveniently graded or "beneficiated" by suspending in water and settling. A 10% suspension can be transferred to another tray and settled about 15 to 20 minutes, leaving the extremely fine material in suspension to be discarded. The product from the second settling was substantially all within the particle size range of 10 to 50 microns. Pumicite differs markedly from "pumice" which is a porous weathered lava, whereas pumicite is composed of hard, glossy fragments.

When used alone in the finishing step on optical glass, the ground pumicite did not possess sufficient "body" to permit uniform rotation of the glass blank on the finishing wheel because of seizure. The addition of 10 parts by weight of emery 12–36 micron grade, to 90 parts of pumicite, largely corrected the difficulty and a mixture of 20 parts of emery to 80 parts of pumicite imparted a fine finish to the lens, had adequate body and was equal or superior to the more costly emery when used alone. The mixture of 70 pumicite-30 emery performed even better than emery alone with respect to smoothness of finish. No advantage resulted in adding more than 50% of emery to the mixture. The addition of emery to the pumicite serves to overcome the packing effect encountered with pumicite alone.

Fused pumicite spheres were made by heating the unground white pumicite to fusion temperature for a fraction of a second. The pumicite was suspended in air stream and blown thru an oxygen-acetylene torch as shown in the drawing. Referring to the drawing, a supply of pumicite is held in tower 10 connected by line 11 to gas mixing chamber 12 leading to torch 13 in furnace 14. Chamber 12 is supplied with fuel gas and oxygen by lines 15 and 16 respectively. The fuel gas can be acetylene, butane, natural gas, etc. The gas velocity thru chamber 12 is maintained sufficiently high to prevent flash back from the torch 13.

Air is admitted by lines 17 and 18 in an amount sufficient to give a clean flame at 13 with reduced oxygen rate. Then valve 19 is closed and valve 20 is opened, diverting the air thru the pumicite in tower 10, carrying some of it in suspension into the torch 13 where the individual particles are fused, substantially without agglomeration, and instantly chilled in the lower section of pipe furnace 14. A current of cool air can be admitted by line 21 into the cooling section of furnace 14 and into the ejector 22. The fused particles solidify into perfect micro-spheres and are conducted by line 23 to cyclone separator 24 where flue gases are separated and discarded by line 25 and the product is removed as a white, free flowing powder at 26. The rate of flow of pumicite can be regulated by the setting of valves 19 and 20.

The particles of pumicite are too small to produce hollow spheres which result when particles of about 100 mesh and coarser are rapidly fused. The solid spheroidized powder is graded to 325 mesh and finer and used in my abrasive composition. This material can be used in place of emery in the same proportion with unfused pumicite and is found to give results equal to or better than emery. The particles provide a rolling action, thus preventing gripping or interlocking of the angular pumicite particles. This effect of spheroidized pumicite to alter the body characteristics of ground pumicite, making it smooth working in the finishing operation, is believed to be entirely new. Neither the ground pumicite nor the spheroidized pumicite is suitable alone for finishing or polishing glass, but the combination meets the exacting working requirements of the lens grinder and polisher.

Where it is desired to make the pumicite even whiter than it is, this can be done by washing with hydrochloric acid or other acid which removes iron and other trace elements which are colored. This treatment can also be given to the pumicite before spherodizing; altho not generally needed. After spheroidizing, the spheres which are too coarse for finishing can be used for roughing, or they can be ground to pass 325 mesh and re-fused in the furnace. The abrasive action of the crushed, fused pumicite appears to be greater than the original pumicite as mined, indicating its hardness has been increased by fusion, probably the result of dehydration.

Instead of the gas furnace described for fusing pumicite, I can use another type of furnace such as an electric arc thru which the particles in suspension are passed. It is desirable to maintain a temperature in the furnace of about 3000° F. or higher in order to obtain the rapid rate of fusion required.

The explanation of superior abrasive action of pumicite and emery or pumicite and spheroidized pumicite in combination is not understood but it is thought to result from the difference in shape of the particles of each ingredient. The particles of emery are approximately equi-dimensional, in this respect simulating the spheres and providing a rolling action on the surface. The particles of pumicite, on the other hand, are elongated and highly angular, giving them entirely different working characteristics, resulting in interlocking and matting. When mixed in the proportions set forth herein, they cooperate to give the smooth cutting action required.

During the finishing operation, some of the spheres are continually broken into sharp cornered fragments which serve to feed new, sharp abrasive into the mixture, thus maintaining its cutting action during use, whereas the spheres themselves have substantially no cutting action.

Having thus described my invention, what I claim is:

1. A finishing composition for glass consisting essentially of 50 to 80% by volume of pumicite and about 20 to 50% of a harder abrasive having particles which are substantially equi-dimensional selected from the class consisting of emery, spheroidized pumicite, Carborundum, garnet, fused alumina and quartz, the particles of said composition being about 5 to 50 microns.

2. The composition of claim 1 wherein the particle size is about 10 to 40 microns.

3. An abrasive for finishing optical glass consisting essentially of an intimate mixture of a dense, hard powdered material having substantially equi-dimensional particles selected from the class consisting of emery, spheroidized pumicite, Carborundum, garnet, fused alumina and quartz, and pumicite in the proportion of about 70% pumicite by weight, to about 30% of the dense, hard material, the particles of both abrasive ingredients being about 5 to 50 microns.

4. The abrasive of claim 3 wherein both abrasive ingredients are sufficiently fine to pass a 325 mesh screen.

References Cited in the file of this patent

UNITED STATES PATENTS

| | | |
|---|---|---|
| 1,504,697 | Menard | Aug. 12, 1924 |
| 1,965,299 | Patterson | July 3, 1934 |
| 2,053,613 | Hunt | Sept. 8, 1936 |
| 2,093,106 | Ayers | Sept. 14, 1937 |
| 2,108,405 | Kennedy | Feb. 15, 1938 |
| 2,248,472 | Fink et al. | July 8, 1941 |
| 2,256,528 | Rowe et al. | Sept. 23, 1941 |
| 2,296,690 | Soderberg | Sept. 22, 1942 |
| 2,334,578 | Potters | Nov. 16, 1943 |
| 2,449,253 | Sargent | Sept. 14, 1948 |
| 2,554,070 | Stead | May 22, 1951 |
| 2,569,323 | Maynard | Sept. 25, 1951 |
| 2,682,460 | Carper | June 29, 1954 |